United States Patent
Home

(10) Patent No.: US 6,708,601 B2
(45) Date of Patent: Mar. 23, 2004

(54) BBQ PUSH-CART WITH RETRACTABLE SUPPORTS

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/164,395

(22) Filed: Jun. 10, 2002

(65) Prior Publication Data

US 2003/0226453 A1 Dec. 11, 2003

(51) Int. Cl.[7] ................ A47J 37/00; A23L 1/00
(52) U.S. Cl. ................ 99/340; 99/450; 99/482; 126/9 R; 126/25 R
(58) Field of Search ............... 99/339, 340, 419–421 V, 99/444–450, 481, 482, 400, 401; 126/25 R, 7 R, 41 R; 108/115, 146, 56, 64; 426/465, 523, 314, 345

(56) References Cited

U.S. PATENT DOCUMENTS 5,452,707 A * 9/1995 Harris et al. .............. 126/41 R
5,934,183 A * 8/1999 Schlosser et al. ............. 99/385
6,205,912 B1 * 3/2001 Chiu ............................ 99/339
6,237,472 B1 * 5/2001 Gates .......................... 99/446
6,397,731 B1 * 6/2002 Gillespie et al. .......... 99/340 X
6,439,220 B1 * 8/2002 Johnson ..................... 126/25 R

* cited by examiner

Primary Examiner—Timothy F. Simone
(74) Attorney, Agent, or Firm—Leong C. Lei

(57) ABSTRACT

A barbecue push-cart with retractable supports is disclosed. The push-cart includes a cart body and a grilling device, and the cart body comprises an enhancing board, an upright support, a plurality of pegs and locking members, the four corners of the enhancing board are perpendicularly mounted with a connection block protruded from the top of the partition, and the cart body, between two connection blocks is mounted with a lateral wall, and at the connection block and the lateral wall, a shaft peg is inserted through so as to fix the connection block and the side wall, at a position corresponding to the peg, a locking member is inserted so that the support is fixed to a locking hole positioned on the locking member, thereby unlocking or releasing the locking member, the retractable support is capable of being stacked onto the enhancing board.

4 Claims, 8 Drawing Sheets

BBQ PUSH-CART WITH RETRACTABLE SUPPORTS

BACKGROUND OF THE INVENTION (a) Field of the Invention

The present invention relates to structure of a barbecue push-cart with retractable supports, and in particular, a cart body having an enhancing board in which the four corners are respectively mounted with a connection block to connect the bottom wall of the support, releasing the locking capability to the bottom wall, and enabling support to be stacked onto the enhancing board.

(a) Description of the Prior Art

A barbecue cart normally comprises a grilling device, a platform and a framework having the bottom end thereof being mounted with a plurality of wheels. However the platform is rigidly fixed to the grilling device and is not retractable. The shipping and storage of the barbecue cart are not convenient and occupy a large space. In addition, the platform and/or the support cannot be conveniently cleaned and therefore it is unhygienic to grill meats or the like. Accordingly, it is an object of the present invention to provide a structure of a barbecue push-cart having retractable supports which mitigates the above drawbacks.

SUMMARY OF THE INVENTION

Accordingly, it is an object of the present invention to provide a structure of a barbecue push-cart with retractable supports having a cart body and a grilling device, wherein the cart body comprises an enhancing board, an upright support, a plurality of pegs and locking members, the four corners of the enhancing board are perpendicularly mounted with a connection block protruding from the top of the partition, and the cart body between two connection blocks are mounted with a lateral wall, and at the connection block and the lateral wall, a shaft peg is inserted through so as to fix the connection block and the side wall; at a position corresponding to the peg, a locking member is inserted so that the support is fixed to a locking hole positioned on the locking member, thereby unlocking or releasing the locking member, and the retractable support is capable of being stacked onto the enhancing board.

Another object of the present invention is to provide a structure of a barbecue push-cart, wherein the dust from burned charcoal is conveniently collected and discarded without overturning the grilling oven, and therefore the entire structure can be cleaned easily.

Yet another object of the present invention is to provide a structure of a barbecue push-cart, wherein the structure is simple and the manufacturing cost is low.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
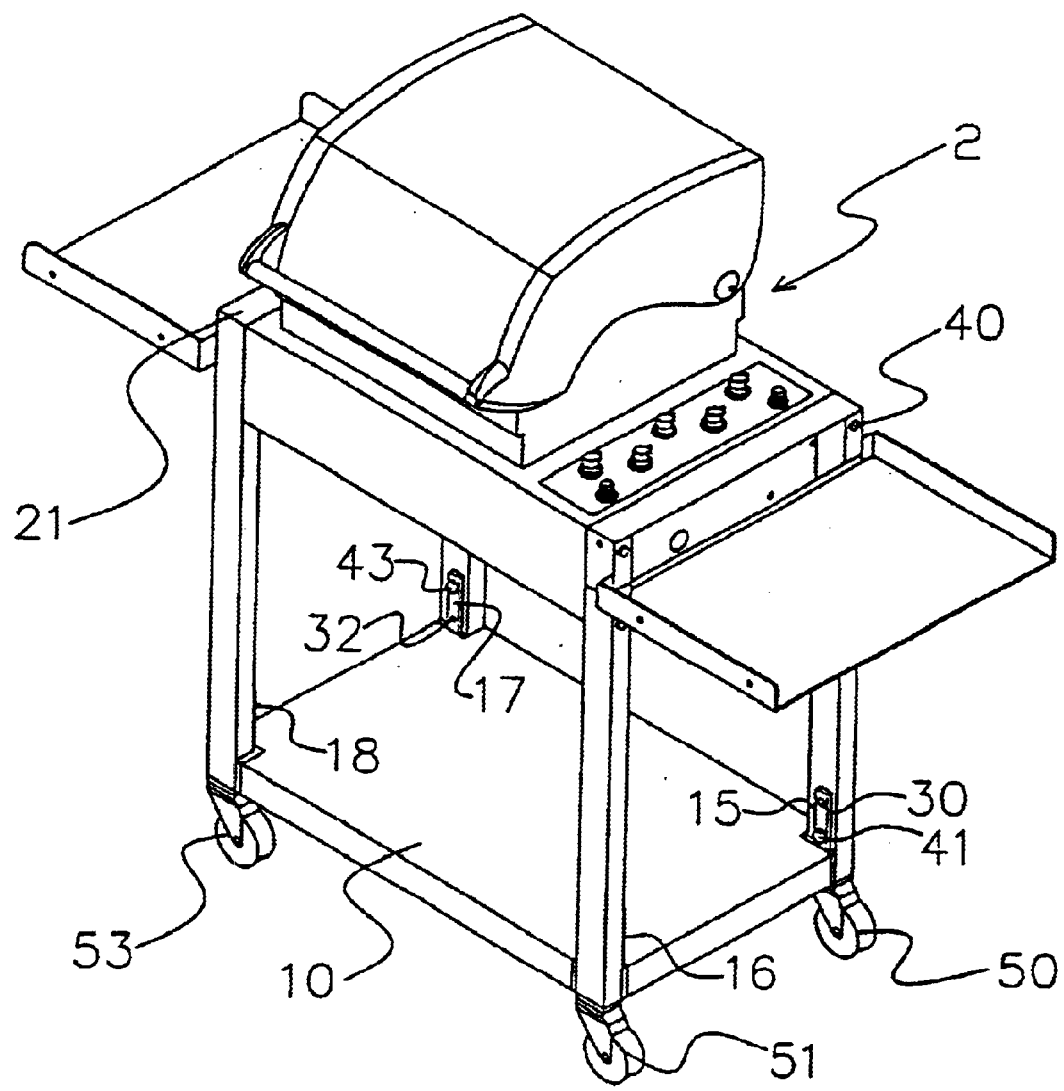
FIG. 1 is a perspective view of a structure of a barbecue push-cart with retractable supports in accordance with the present invention.
Figure 2:
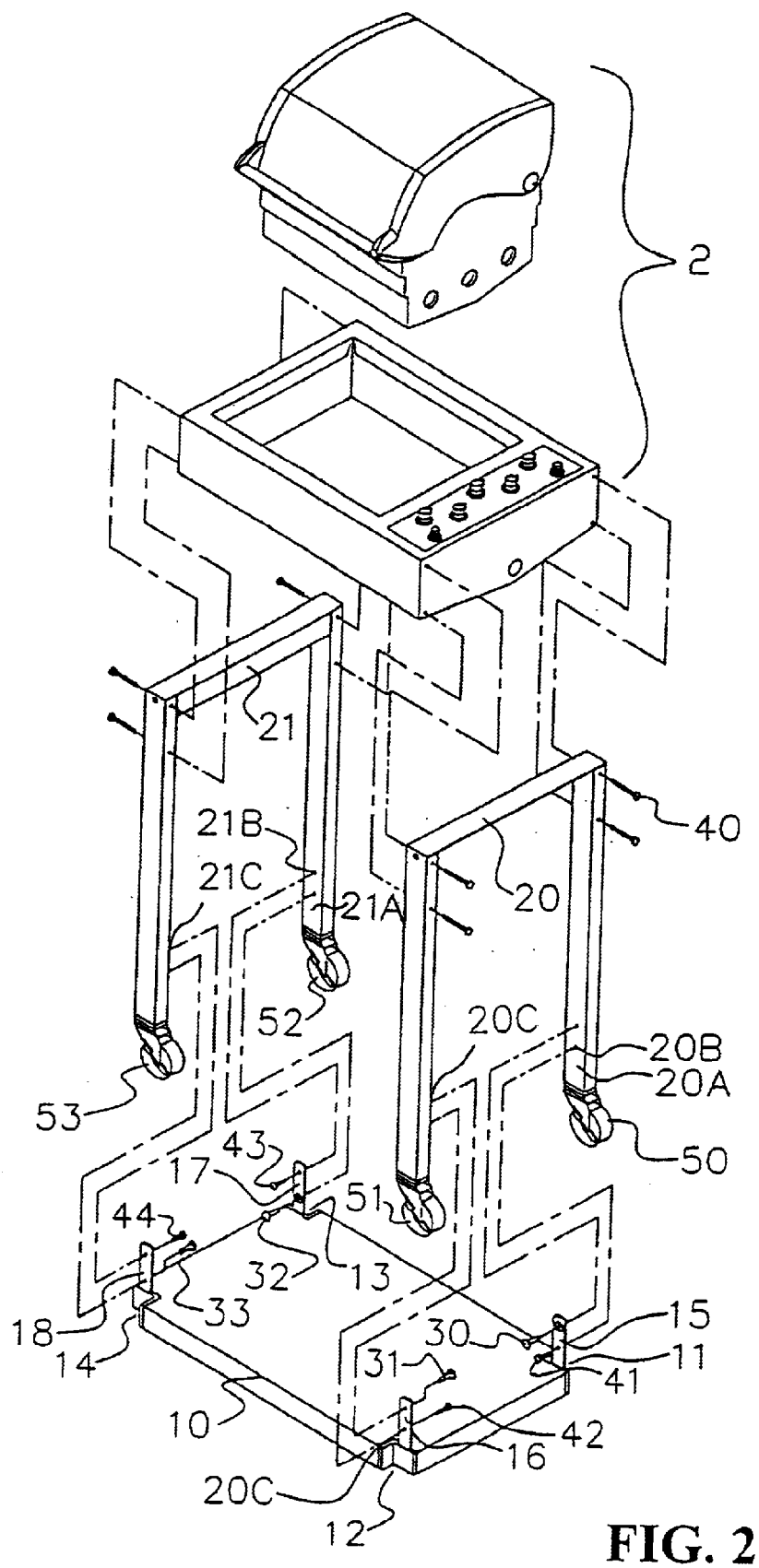
FIG. 2 is a perspective exploded view of FIG. in accordance with the present invention.

Referring to FIGS. 1 and 2, there is shown the structure of a barbecue push-cart with retractable supports 1 having a cart body and a grilling device 2. The cart body comprises an enhancing board 10, a pair of upright supports 20, 21, a plurality of pegs 30, 31, 31, 33 and locking members 40, 41, 42, 43, 44. The four corners of the enhancing board 10 are provided with notches 11, 12, 13, 14 for holding the exterior of the supports 20, 21. The edge walls containing the notches 11, 12, 13, 14 are each perpendicularly mounted with connection blocks 15, 16, 17, 18 protruded from the top of the board 10, and the cart body 10, between two connection blocks 15, 16 or 17, 18, is mounted with a lateral wall 20A, 21A, and shaft pegs 30, 31, 32, 33 are inserted through the connection blocks 15, 16, 17, 18 and the lateral walls 20A, 21A so as to fix the connection blocks 15, 16, 17, 18 and the side walls 20A, 21A, at a position corresponding to the pegs 30, 31, 32, 33, and at least a locking member 41, 42, 43, 44 is inserted to the locking holes 20B, 20C, 20D so that the support is fixed to a locking hole positioned on the locking member. The locking holes 20B, 20C, 21B, 21C are aligned with the screw holes.

Figure 3:
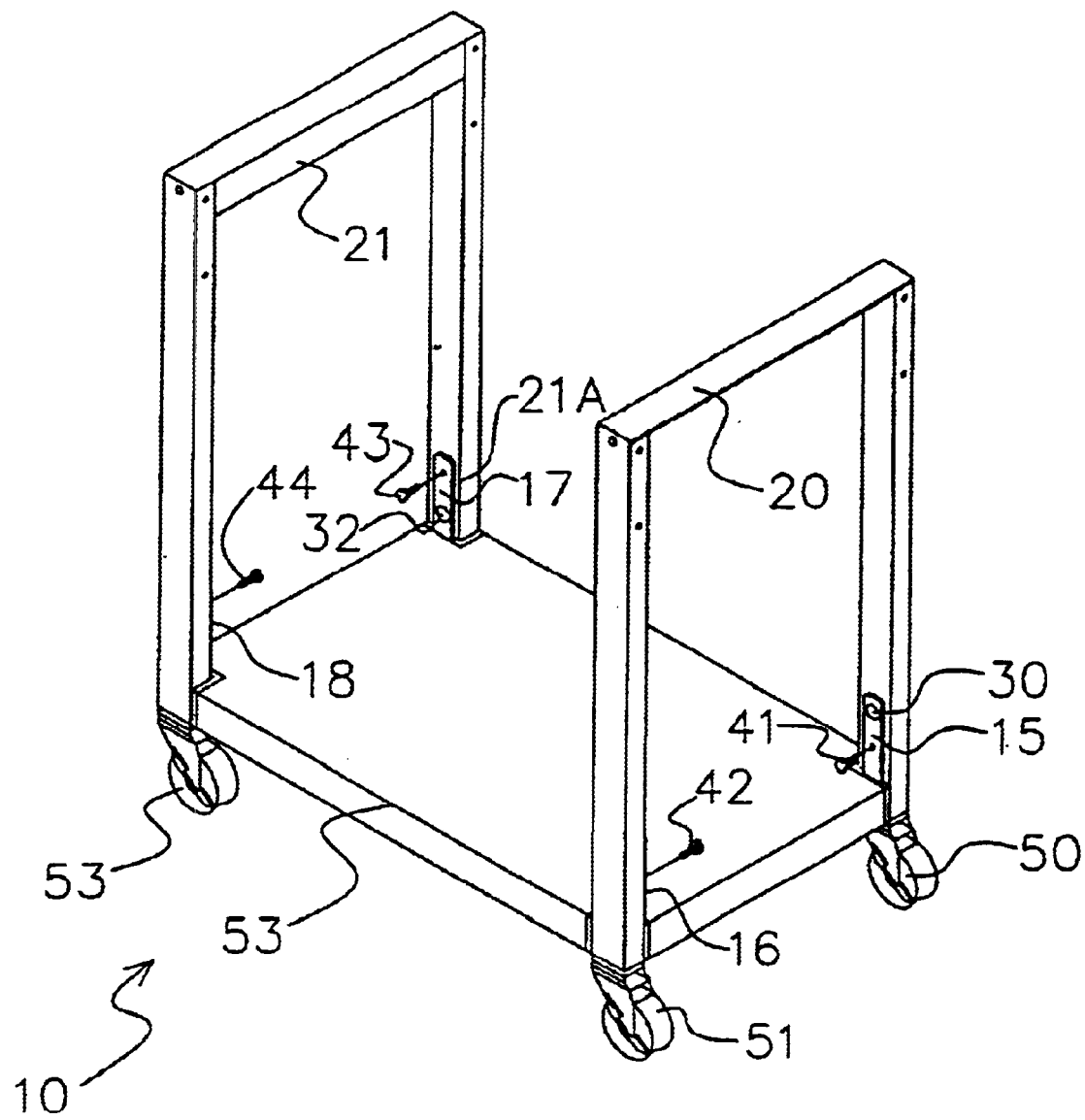
FIGS. 3 to 5 show the operation of the barbecue push-cart with retractable supports in accordance with the present invention.
Figure 4:
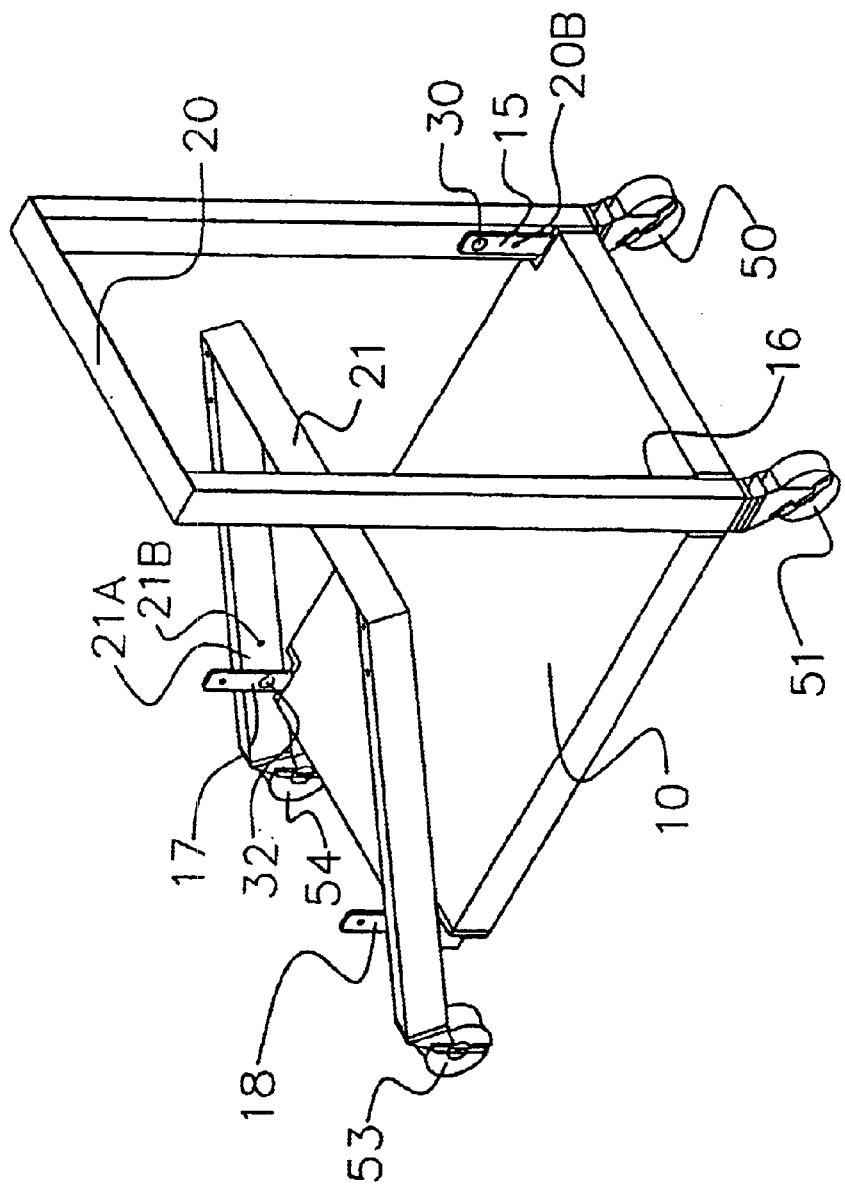
Figure 5:
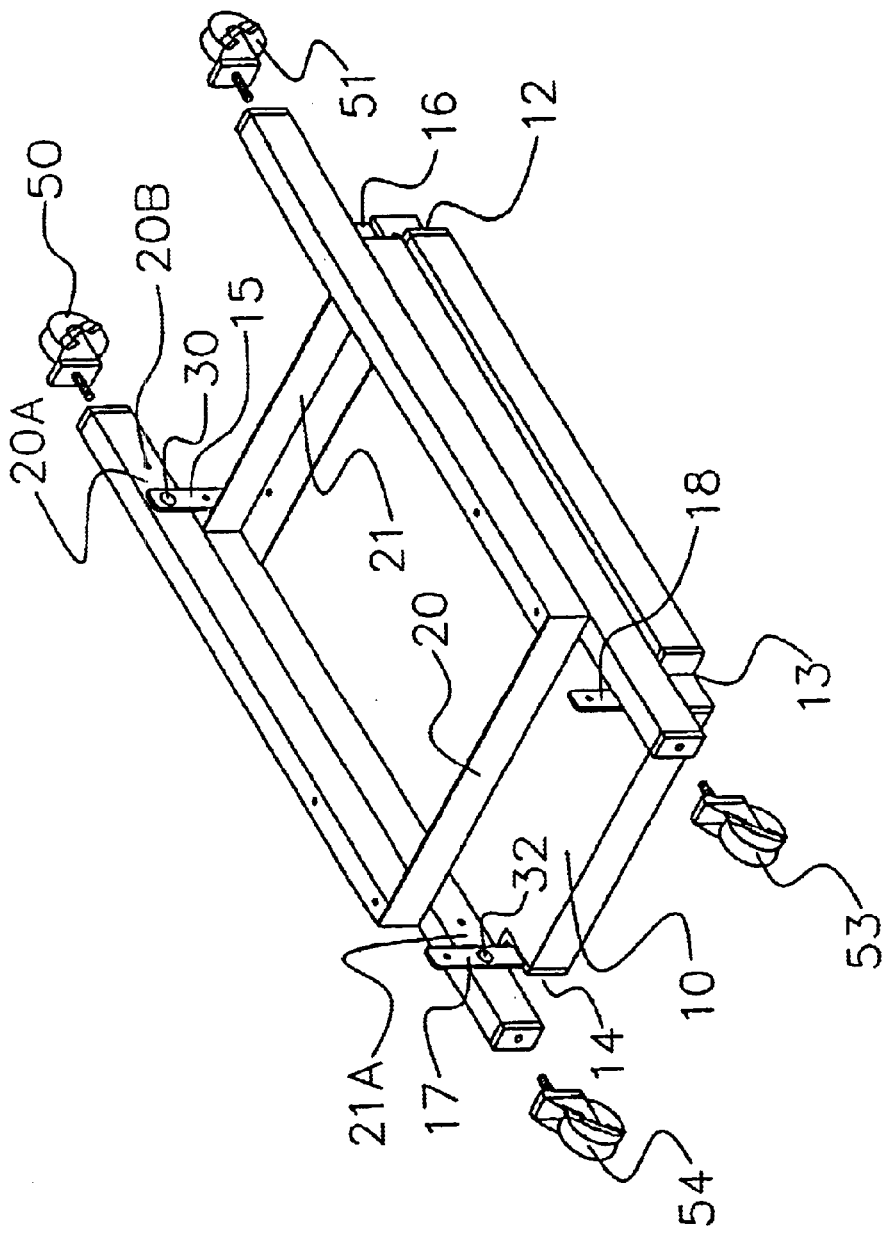

When the cart 1 is to be retracted, the top end of the supports 20, 21 is unloaded, and the locking member 40 of the grilling device 2 is locked. The procedures are shown in FIGS. 3 to 5, wherein the locking members 41, 42, 43, 44 are unlocked and the supports 20, 21 are retracted to the enhancing board 10 beside the shaft pegs 30, 32. The shaft peg 32 is at a position higher than the stacked support, therefore the supports 20, 21 can be stacked on the enhancing board 10.

The wheels 50, 51, 52, 53 can be unloaded. If the cart is to be used, the loading procedures are the reverse of the unloading procedures. The wheels 50 to 53 are mounted and the supports 20, 21 are placed upright and pulled out to position, and the locking members 41, 44 are locked to the locking holes 20B, 20C and 21B.

Figure 6:
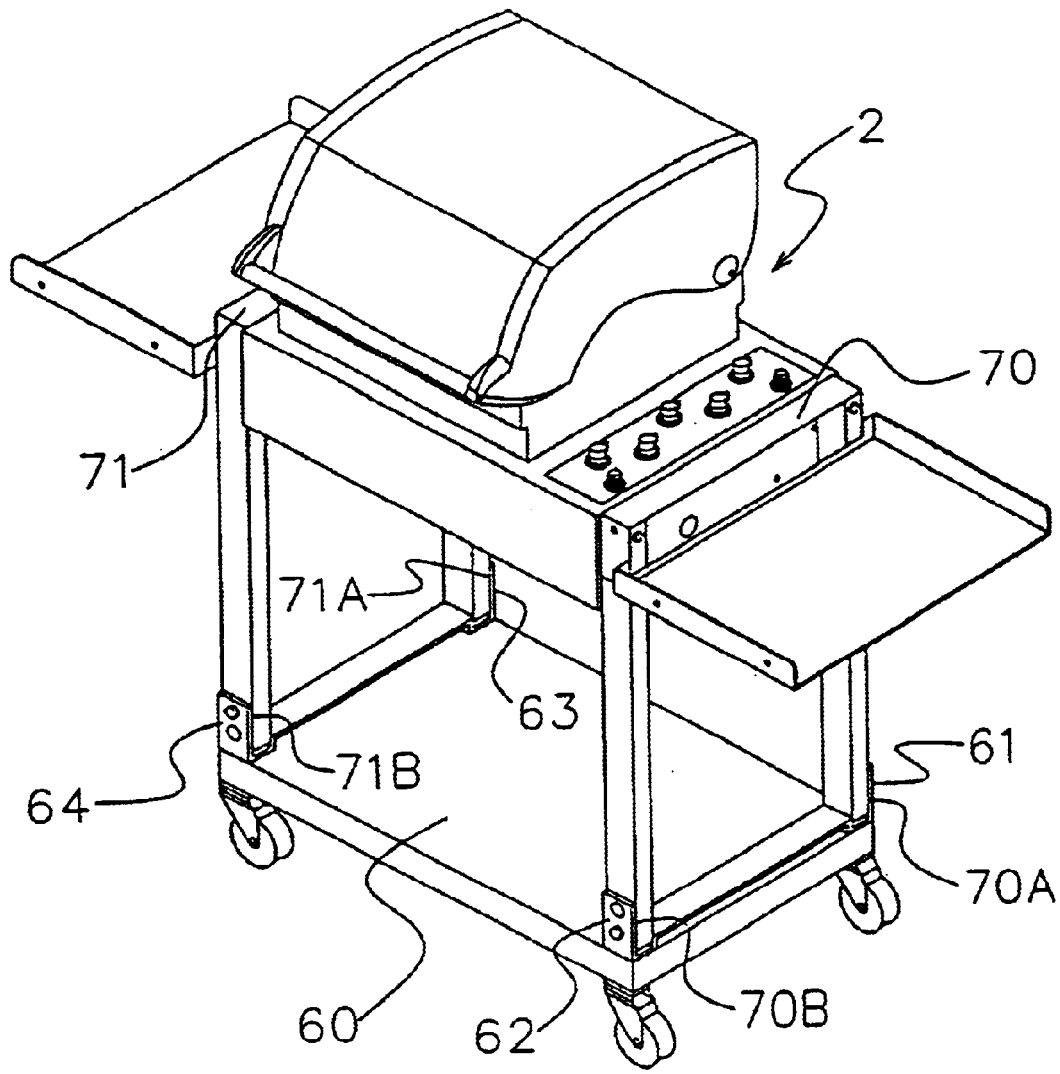
FIG. 6 is a perspective view of the barbecue push-cart with retractable supports in an alternative preferred embodiment in accordance with the present invention.
Figure 7:
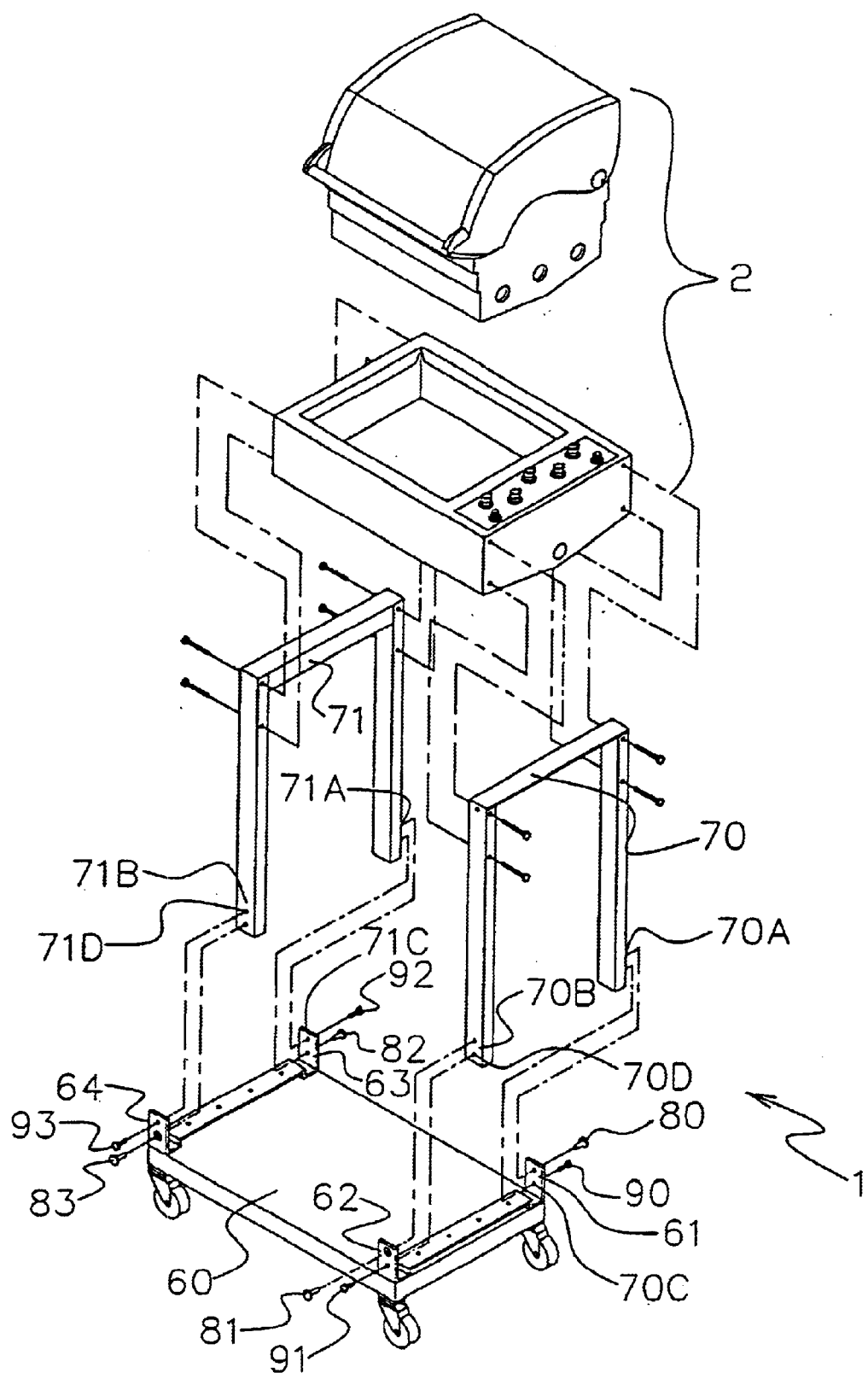
FIG. 7 is a perspective exploded view of FIG. 6.
Figure 8:
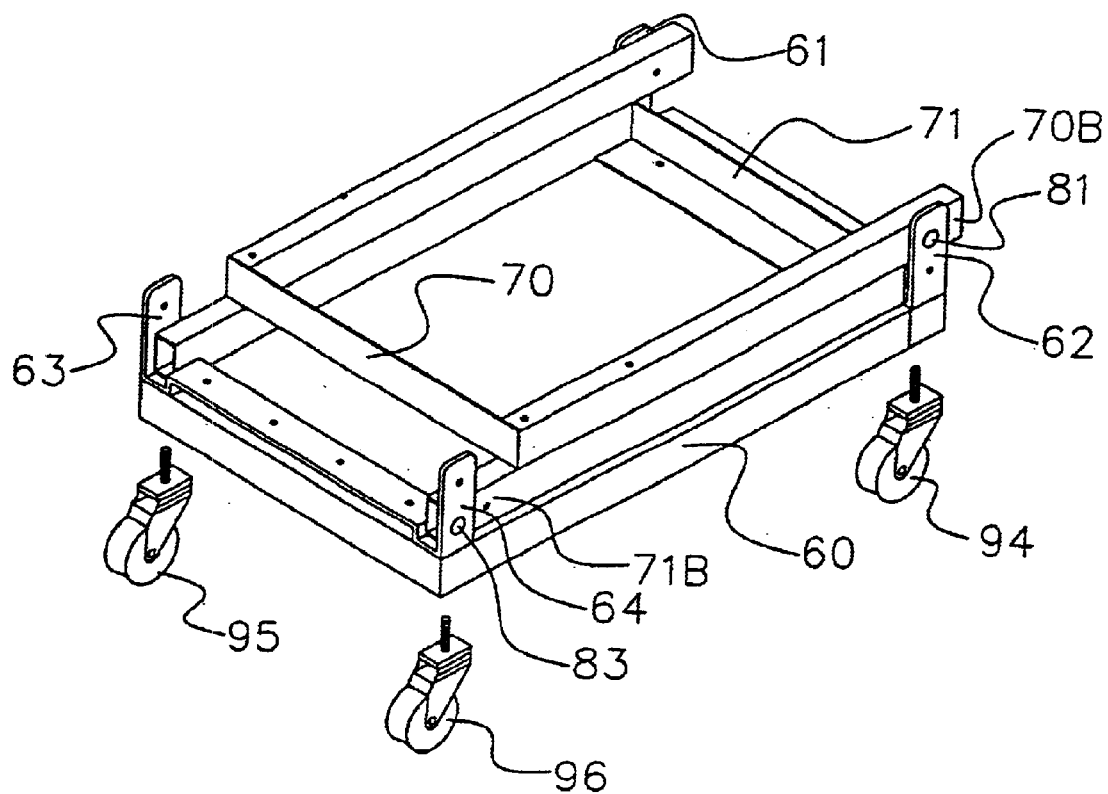
FIG. 8 shows the operation of the barbecue push-cart with retractable supports in accordance with the present invention.

Referring to FIGS. 6 and FIG. 7, there is shown a push cart of another preferred embodiment in accordance with the present invention. The four corners of the enhancing board 60 are not provided with notches, and the external walls of the four corners of the enhancing board 10 are provided with connection blocks 61 to 64 and between two connection blocks 61, 62 or 63, 64, lateral walls 70A, 70B, 71A, 71B are fastened at an appropriated height and shaft peg 80 to 83 passes therethrough, and the lateral walls 70A, 70B, 71A, 71B are mounted. Locking holes 70C, 70D, 71C, 71D for locking with support are provided to the connection blocks 61 to 64 and the lateral wall 70A, 70B, 71A, 71B corresponding to the appropriate position of the shaft peg 80, 81, 82. The locking holes 70C, 70D, 71C, 71D can be inserted with locking members 90 to 93 such that the bottom end of the support 70, 71 are positioned closely at the enhancing board 60. As shown in the figure, the locking members 90 to 93 can be screws, and the locking holes 70C, 70D, 71C, 71D are screw holes for mounting. The wheels 94 to 96 are mounted at the bottom of the four corners of the enhancing board 60. In view of the structure of the present preferred embodiment, after the locking members 90, 93 are locked, as shown in FIG. 8, the supports 70, 71 are horizontally positioned onto the enhancing board 60. Thus, the size of the cart is minimized for packaging and shipping.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A barbecue push-cart with retractable supports having a cart body and a grilling device, characterized in that the cart body comprises an enhancing board, an upright support, a plurality of pegs and locking members, four corners of the enhancing board is perpendicularly mounted with a connection block protruded a top of a partition, and the cart body between two connection blocks is mounted with a lateral wall, and at the connection block and the lateral wall, a shaft peg is inserted through so as to fix the connection blocks and the side wall, at a position corresponding to the pegs, a locking member is inserted so that the support is fixed to a locking hole positioned on the locking members thereby unlocking or releasing the locking members, and therefore enabling the retractable support to be stacked onto the enhancing board.

2. The barbecue push-cart with retractable supports of claim 1, wherein the four corners of the enhancing board is provided with a notch to hold an exterior of the support and the edge wall of the notch is provided connection blocks perpendicularly protruded from the top of the board.

3. The barbecue push-cart with retractable supports of claim 1, wherein a bottom end of the support is located closely to a surface of the enhancing board.

4. The barbecue push-cart with retractable supports of claim 1, wherein the locking member includes screws and the locking hole is corresponding to screw holes for screw-mounting.

* * * * *